(12) United States Patent
Cousseau et al.

(10) Patent No.: US 12,085,014 B2
(45) Date of Patent: Sep. 10, 2024

(54) FERRULE FOR COUNTER-ROTATING TURBINE IMPELLER

(71) Applicant: SAFRAN AIRCRAFT ENGINES, Paris (FR)

(72) Inventors: Simon Jean-Marie Bernard Cousseau, Moissy-Cramayel (FR); Mathieu Patrick Henri Delalandre, Moissy-Cramayel (FR); Patrick Jean Laurent Sultana, Moissy-Cramayel (FR); Laurent Cédric Zamai, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/754,858

(22) PCT Filed: Oct. 8, 2020

(86) PCT No.: PCT/FR2020/051782
§ 371 (c)(1),
(2) Date: Apr. 14, 2022

(87) PCT Pub. No.: WO2021/074508
PCT Pub. Date: Apr. 22, 2021

(65) Prior Publication Data
US 2024/0093638 A1    Mar. 21, 2024

(30) Foreign Application Priority Data
Oct. 17, 2019 (FR) .................................. 1911614

(51) Int. Cl.
*F02C 3/067* (2006.01)

(52) U.S. Cl.
CPC .......... *F02C 3/067* (2013.01); *F05D 2240/24* (2013.01); *F05D 2250/44* (2013.01)

(58) Field of Classification Search
CPC . F01D 1/26; F01D 25/06; F01D 25/16; F01D 25/164; F01D 25/243; F01D 25/28;
(Continued)

(56) References Cited

U.S. PATENT DOCUMENTS

| | | | |
|---|---|---|---|
| 7,186,073 B2* | 3/2007 | Orlando | F01D 1/26 29/889.21 |
| 10,508,714 B2* | 12/2019 | Grubba | F01D 5/026 |

FOREIGN PATENT DOCUMENTS

| | | |
|---|---|---|
| EP | 1626170 A1 | 2/2006 |
| FR | 2601069 A1 | 1/1988 |

(Continued)

OTHER PUBLICATIONS

French Search Report issued in French Application 1911614 on Jun. 23, 2020 (2 pages).
(Continued)

*Primary Examiner* — Alain Chau
*Assistant Examiner* — Sean V Meiller
(74) *Attorney, Agent, or Firm* — Bookoff McAndrews, PLLC

(57) ABSTRACT

A counter-rotating turbine for a turbine engine comprising an inner rotor having an inner drum to which is attached a plurality of inner impellers rotatably supported by a first shaft, an outer rotor comprising an outer drum to which is fastened a plurality of outer impellers rotatably supported by a second shaft coaxial with the first shaft, the outer rotor comprising a downstream impeller having a plurality of downstream moving blades extending between an outer shroud and an inner shroud, one upstream end of the outer shroud being attached downstream of said outer drum, the inner shroud being attached to the second shaft, at least one of the inner shroud and of the outer shroud comprising at
(Continued)

least one flexible transition part configured to allow elastic deformation of said shroud in the radial direction.

12 Claims, 3 Drawing Sheets

(58) Field of Classification Search
CPC . F01D 5/026; F01D 5/03; F01D 5/066; F02K 3/072; F05D 2240/24; F05D 2240/62; F05D 2250/44; F02C 3/067
See application file for complete search history.

(56) References Cited

FOREIGN PATENT DOCUMENTS

GB          586552 A      3/1947
GB          586552 A1  *  3/1947

OTHER PUBLICATIONS

International Search and Written Opinion issued in International Application PCT/FR2020/051782 on Jan. 15, 2021 (7 pages).

* cited by examiner

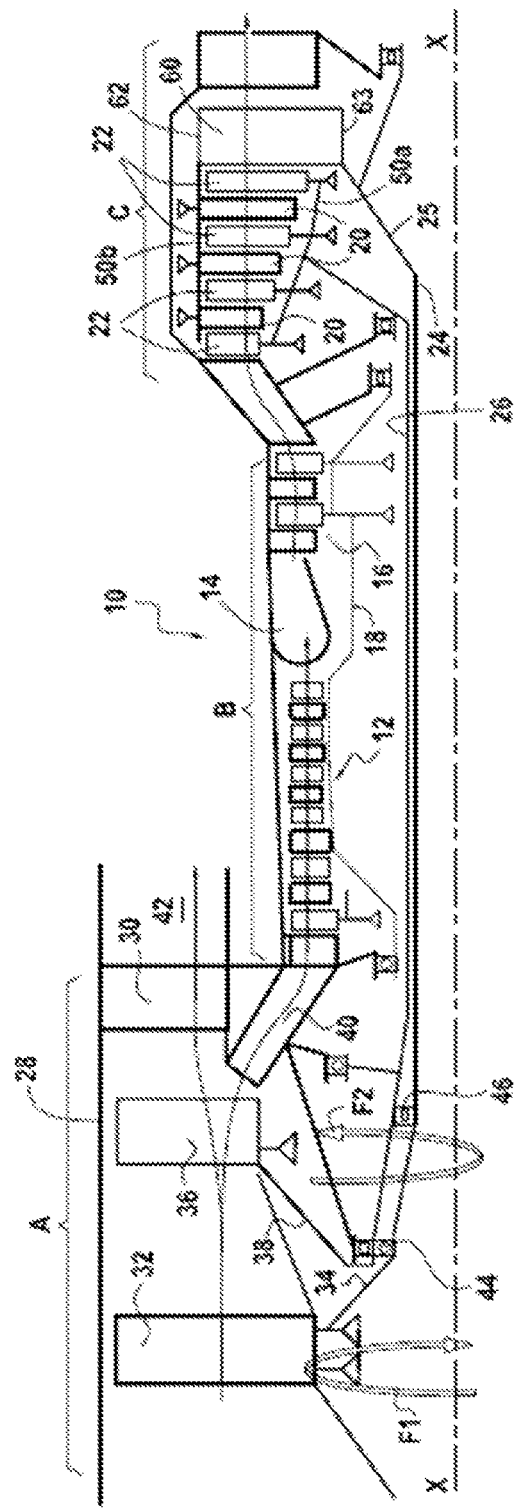
[Fig. 1]

[Fig. 2]
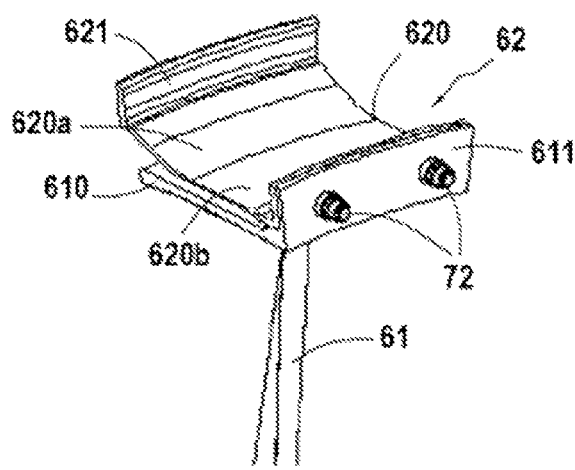
[Fig. 3]
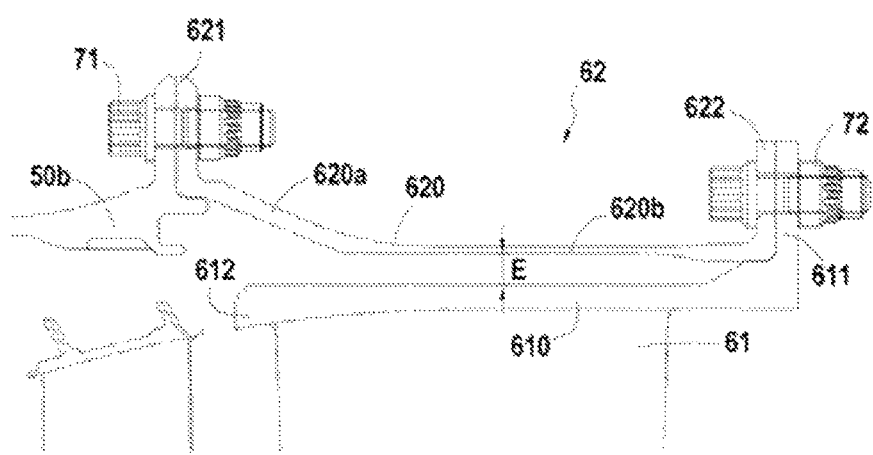

[Fig. 4]
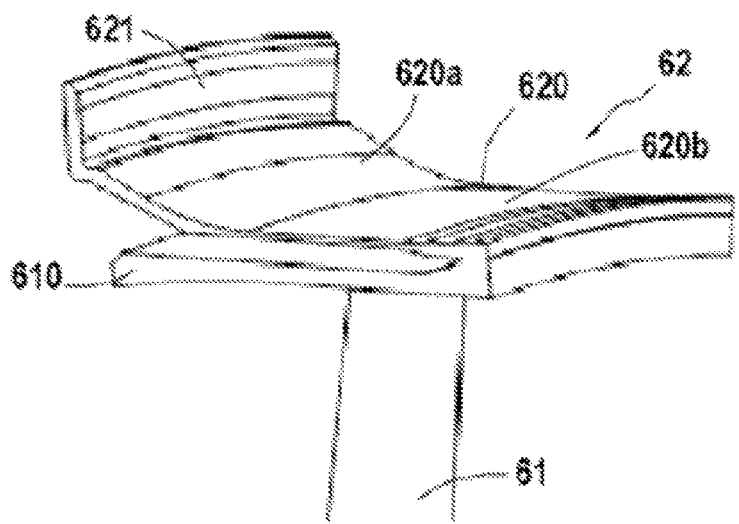
[Fig. 5]
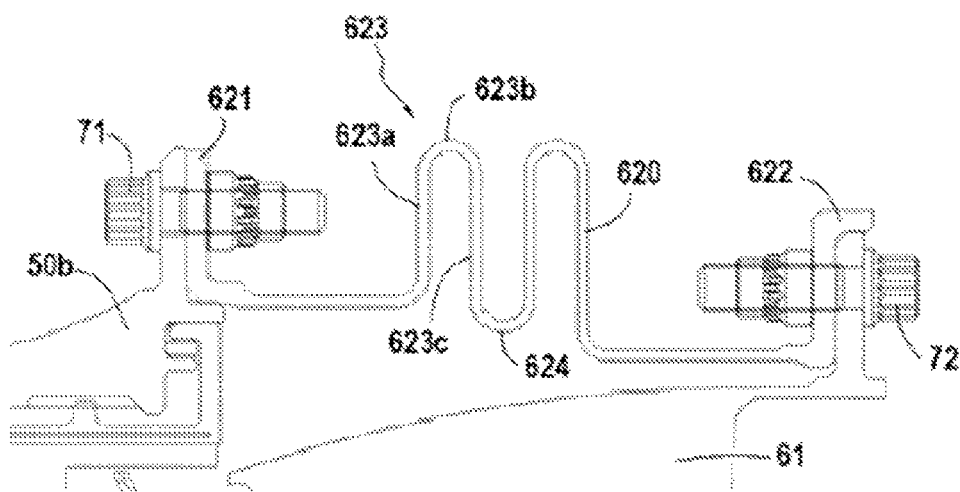

US 12,085,014 B2

FERRULE FOR COUNTER-ROTATING TURBINE IMPELLER

CROSS-REFERENCE TO RELATED APPLICATIONS

This application is a National Stage Application of International Application PCT/FR2020/051782, filed on Oct. 8, 2020, now published as WO 2021/074508 A1, and which claims priority to French Patent Application No. 1911614, filed on Oct. 17, 2019, which is incorporated by reference herein in its entirety.

TECHNICAL FIELD

The present disclosure relates to the field of turbine engines. More precisely, the presend disclosure relates to a counter-rotating turbine for a turbine engine and a turbine engine comprising such a turbine.

PRIOR ART

An aircraft turbine engine generally comprises, from upstream to downstream in the gas flow direction, a fan, a low-pressure compressor, a high-pressure compressor, a combustion chamber, a high-pressure turbine and a low-pressure turbine. The rotor of the low-pressure compressor is driven by the rotor of the low-pressure turbine, and the rotor of the high-pressure compressor is driven by the rotor of the high pressure turbine.

In order to improve the efficiency of the engine, aircraft turbine engines can be equipped with a counter-rotating turbine in place of the low-pressure turbine. The counter-rotating turbine comprises an inner rotor, called the rapid rotor, connected to a first turbine shaft and configured to rotate in a first direction of rotation, and an outer rotor, called the slow rotor, connected to a second turbine shaft and configured to rotate coaxially with the inner rotor and in a second direction of rotation, opposite to the first direction of rotation. The blades of the first rotor are interleaved with the blades of the second rotor in the axial direction. The blades of the inner rotor are attached to a disk or inner drum integral with the first turbine shaft and rotating in the first direction of rotation, and the blades of the outer rotor are attached to a disk or outer drum integral with the second turbine shaft and rotating in the second direction of rotation.

In known fashion, the linkage between the outer drum of the outer rotor and the second turbine shaft is accomplished by means of a downstream impeller attached to the outer drum, downstream of it. More precisely, the downstream impeller comprises an outer radial shroud attached to the outer drum, axially downstream of it, and an inner radial shroud, or inner ferrule or disk, integral with the second turbine shaft, particularly by means of a rear support shaft extending between the inner shroud and the second turbine shaft. Blades extend radially between the inner shroud and the outer shroud, and allow maintaining the latter integral with one another, the rotation of one driving the rotation of the other. Thus, when the blades of the outer rotor are driven in rotation in the second direction of rotation, the rotation of the outer drum drives the rotation of the outer shroud. This rotation movement is transmitted to the inner shroud by means of the blades of the downstream shroud, allowing the rotation of the second turbine shaft.

The inner and outer shrouds, and the blades extending between them, form a single identical part, the downstream impeller thus being manufactured in a single piece. However, the blades of the downstream impeller undergo the temperatures of the hot air flow stream in which they are immersed. These blades are therefore dilated more than the inner and outer shrouds, which are subjected to lower temperatures. The deformation of the blades to the high temperatures of the stream consequently generate high stresses on the outer and inner shrouds, called the "punching" phenomenon. Moreover, the centrifugal forces accentuate these stresses. These different stresses affect the reliability and the lifetime of the blades of the downstream impeller, and by extension of the turbine.

There exists therefor a need for a counter-rotating turbine architecture allowing mitigating at least partly the disadvantages above.

DISCLOSURE OF THE INVENTION

The present disclosure relates to a counter-rotating turbine for a turbine engine extending around an axis of rotation and comprising:

an inner rotor configured to rotate around the axis of rotation, and comprising an inner drum to which a plurality of inner impellers is attached, each comprising inner moving blades and being rotatably supported by a first shaft, an outer rotor configured to rotate around the axis of rotation in a direction opposite to the direction of rotation of the inner rotor, and comprising an outer drum to which is attached a plurality of outer impellers, each comprising inner moving blades and being rotatably supported by a second shaft coaxial with the first shaft, the outer rotor comprising a downstream impeller having a plurality of downstream moving blades extending between an outer shroud and an inner shroud, an upstream end of the outer shroud being attached to the outer drum downstream of said outer drum, the inner shroud being attached to the second shaft, at least one of the inner shroud and of the outer shroud comprising at least one flexible transition part configured to allow elastic deformation of said shroud in the radial direction.

In the present disclosure, the terms "inner" and "outer" and the terms "inside" and "outside" and their derivatives are considered in the radial direction of the turbine. Likewise, the terms "upstream" and "downstream" are considered in the flow direction of the gases in the turbine engine, along the axis of rotation.

The first and the second shaft can be tubular, and are coaxial, extending along the axis of rotation. The inner impellers of the inner rotor are interleaved, in the axial direction, with the outer impellers of the outer rotor. The downstream impeller is attached to the outer drum downstream of the latter, and rotates at the same time as the latter. The downstream impeller allows linking the outer drum and the second shaft and thus transmitting the torque of the outer impellers to the second shaft.

The elevated temperatures to which the downstream impellers are subjected in the hot air flow stream cause a dilation of these blades, and therefore their extension in the radial direction. However, the presence of the flexible transition part allows absorbing this deformation of the blades. More precisely, the deformation of the blades, particularly their extension, causes an elastic deformation of the shroud by means of the flexible transition part. In the event of cooling of the flow stream causing a retraction of the downstream moving blades, the shroud then returns elastically to its initial shape. Thus the flexible transition part allows absorbing the stresses generated by the dilation of the downstream moving blades, and avoiding the phenomenon of punching of the inner and/or outer shrouds, while still allowing the transmission of the torque generated by the blades of the outer rotor. This allows limiting, even eliminating the deterioration of the inner and/or outer shrouds caused by the dilation of the downstream moving blades, and thus improves the reliability and the lifetime of the turbine.

In certain embodiments, the outer shroud is attached to a platform of a radially outer end of a downstream moving blade, the flexible transition part being attached between the downstream end of the outer drum and the platform so that a displacement of the platform in the radial direction causes an elastic deformation of the flexible transition part.

Preferably, each blade extends between two individual platforms. Alternatively, the same platform can be attached to the end of several blades simultaneously, thus forming a blade sector. The platform is attached to the radially outer end of a downstream moving blade so as to form only a single and identical part with it. The platform and the blade can in particular be manufactured in a single piece. The platforms allow delimiting the hot air flow stream.

The torque generated by the rotation of the outer drum is transmitted to the downstream moving blades by means of the flexible transition part and of the platform. Thus, the flexible transmission part is configured to be able to deform elastically in the radial direction, while having sufficient stiffness in the circumferential direction so as to be able to transmit the torque of the outer drum to the downstream moving blades. This configuration can be applied similarly to the outer shroud.

In certain embodiments, the flexible transition part has the shape of a plate attached at its upstream end to the outer drum, and at its downstream end to the platform, the flexible transition part being spaced radially from the platform between said upstream end and said downstream end.

The flexible transition part and the platform form two plates attached to one another at their downstream end. Thus, aside from the attachment between the flexible transition part and the platform, the latter are spaced radially away from one another. Thus, in the case of a radial dilation of a blade, causing an outward displacement of the platform in the radial direction, said platform approaches the flexible transition part by reducing the space between said platform and the flexible transition part, the latter moreover being attached to the outer drum at its upstream end. In other words, the flexible transition part acts like a spring attached between the outer drum and the platform, the elastic deformation of which allows absorbing the radial dilation stresses of the downstream moving blades.

In certain embodiments, a first attachment between the downstream end of the flexible transition part and the downstream end of the platform is radially offset toward the inside of the turbine relative to a second attachment between the upstream end of the flexible transition part and the outer drum.

A configuration of this type allows accentuating the space between the platform and the flexible transition part, thus allowing increasing the capacity of the flexible transition part for absorbing the dilations of the downstream moving blades.

In certain embodiments, the flexible transition part and the platform are two distinct parts, the downstream end of the platform being attached to the downstream end of the flexible transition part by means of a link.

The flexible transition part can in particular include a radial flange at each of its axial ends, an upstream radial flange being attached to the outer drum and a downstream radial flange being attached to the downstream end of the platform by means of the link.

In certain embodiments, the link comprises a bolted connection.

This means of attachment has the advantage of being simple to implement, and allows effective attachment of these two parts, allowing the elastic deformation of the flexible transition part in the event of deformation of the blades, the deformation forces passing through this bolted connection.

In certain embodiments, the flexible transition part and the platform form a single and identical part.

This configuration also allows effective transmission of the deformation forces originating in the blades, causing the elastic deformation of the flexible transition part. This configuration also allows limiting the number of parts of the device, thus simplifying the structure and the manufacture of the turbine.

In certain embodiments, the flexible transition part comprises, from its upstream end to its downstream end, at least one inclined portion inclined toward the center of the turbine, and at least one straight portion substantially parallel to the axis of rotation.

The presence of the inclined portion facilitates the radial deformation of the flexible transition part. Thus the bent portion formed between the inclined portion and the straight portion substantially parallel to the axis of rotation allows improving the elasticity of the flexible transition part in the radial direction.

In certain embodiments, the flexible transition part comprises at least one radial fold, a radial fold being a portion of the flexible transition part comprising, from upstream to downstream, a first wall extending radially toward the outside of the turbine, a second wall curved toward the inside of the turbine and extending from one end of the first wall, and a third wall extending radially toward the inside of the turbine from one end of the second wall.

The presence of a radial fold allows improving the flexibility of the flexible transition part in the axial direction. This flexibility allows absorbing dynamic changes, particularly vibrations, extreme loads, etc.

In certain embodiments, the outer shroud comprises a plurality of shroud sectors arranged circumferentially end to end, each shroud sector being attached to at least one downstream moving blade and comprising a platform and a flexible transition part.

The present disclosure also relates to a turbine engine comprising the counter-rotating turbine according to any one of the preceding embodiments.

BRIEF DESCRIPTION OF THE DRAWINGS

The invention and its advantages will be better understood upon reading the detailed description given hereafter of different embodiments of the invention given by way of non-limiting examples. This description refers to the appended pages of figures, in which:

FIG. 1 shows a general view illustrating the principle of operation of a turbine engine with counter-rotating fans, FIG. 2 shows a perspective view of an outer shroud sector according to a first embodiment of the present disclosure, FIG. 3 shows a side view of the outer shroud sector of FIG. 2, FIG. 4 shows a perspective view of an outer shroud sector according to a second embodiment of the present disclosure, FIG. 5 shows a lateral view of an outer shroud sector according to a third embodiment of the present disclosure,

DESCRIPTION OF THE EMBODIMENTS

With reference to FIG. 1, a turbine engine 10 with counter-rotating fans includes a longitudinal axis X-X. From upstream to downstream according to the flow direction of the gases in the turbine engine (shown by the block arrow), the turbine engine 10 comprises essentially three parts: an upstream module A (or fan section), an intermediate module B (or high-pressure spool), and a downstream module C (or low-pressure turbine section). Moreover, the terms "inner" or "outer" and their derivatives refer to the radial direction of the turbine engine, the radial direction being perpendicular to the axis X-X.

The three parts A, B and C of the turbine engine are modular, i.e. they each form a single assembly and can each be replaced by being separated from the other parts of the turbine engine.

In a manner well known per se, the high-pressure body B comprises a gas generator for producing combustion gases. This gas generator comprises a compressor 12, a combustion chamber 14 and a high-pressure turbine 16.

The air compressed by the compressor 12 is mixed with the fuel in the combustion chamber 14 before being burned there. The combustion gases thus produced drive the moving blades of the high-pressure turbine 16, which for its part drives the compressor 12 by means of a high-pressure shaft 18. The circulation of the combustion gases in the turbine engine 10 occurs axially from upstream to downstream.

The fan section A is located upstream of the turbine engine 10. A hood 28 surrounds in an annular fashion this fan section A The hood 28 is supported by arms 30 which extend radially toward the inside of the turbine engine.

The fan section A includes a first row of fan blades 32 mounted on an upstream fan shaft 34 which is linked to an upstream end of the first low-pressure shaft 24.

The fan section A also includes a second row of fan blades 36 which are spaced axially downstream of the first row of fan blades 32 and mounted on a downstream fan shaft 38 linked to an upstream end of the second low-pressure shaft 26. Nevertheless, the present disclosure is not limited to an architecture with two fan stages, and can be applied to other types of architecture.

The first and second rows of fan blades 32, 36 thus rotate in the opposite directions that are shown, by way of examples, by the respective arrows F1 and F2. This configuration with counter-rotating fans thus confers on the turbine engine a high efficiency for a relatively small specific fuel consumption.

The fan blades 32, 36 extend radially from the upstream 34 and downstream 38 fan shafts practically until the hood 28. They are arranged in the air circulation passage supplying both the primary stream 40 leading to the compressor 12 of the high-pressure spool B and the secondary bypass stream 42.

At its upstream end, the first low-pressure shaft 24 supports in rotation the second low-pressure shaft 26 by means of a first antifriction bearing 44 and a second antifriction bearing 46 arranged downstream of the first.

The first antifriction bearing 44 is of the ball type for resisting axial loads, while the second antifriction bearing 46 is of the roller type for resisting the radial loads of the turbine engine.

The low-pressure turbine section C comprises a first annular rotor, or outer rotor. This first rotor comprises a row of inner impellers comprising outer movable turbine blades 20 which extend radially inward and are spaced axially away from one another.

The low-pressure turbine section C also comprises a second annular rotor, or inner rotor. This second rotor comprises a row of inner impellers comprising inner movable turbine blades 22 which extend radially toward the outside and which are spaced axially away from one another. The turbine blades 20, 22 of the first and second rotors are arranged alternately relative to one another so that the first and the second rotors are interlocked with one another.

The outer impellers of the first rotor are rotatably supported by the first low-pressure shaft 24. Likewise, the other impellers of the second rotor are rotatably supported by the second low-pressure shaft 26 arranged coaxially around the first shaft 24. The low-pressure shafts 24, 26 extend axially from upstream to downstream in the turbine engine.

The low-pressure turbine section C has the combustion gases originating in the high-pressure spool B passing through it. These combustion gases therefore drive in rotation the turbine blades 20, 22 of the first and second rotors in opposite directions. Thus, the first and second low-pressure shafts 24, 26 also rotate in counter-rotation.

Moreover, the inner impellers 22 comprise a root attached to an inner drum 50*a*, and extending radially outward from this root until a radially outer end. The outer moving blades 20 comprise an outer portion attached to an outer drum 50*b*, and extending radially inward from this base to a radially inner end.

The continuation of the description describes a means for attaching downstream moving blades with reference to the low-pressure turbine C of the turbine engine 10. Nevertheless, this attachment method is not limited to this low-pressure turbine, and may be adapted to other elements of the turbine engine, for example the high-pressure turbine.

The linkage between the outer drum 50*b* of the outer rotor, and the second turbine shaft 24, is accomplished by means of a downstream impeller 60 attached to the outer drum 50*b* downstream of it. More precisely, this downstream impeller 60 is the impeller arranged farthest downstream in the outer rotor. This can in particular involve, in known fashion, stage number 6 of the counter-rotating turbine. This downstream impeller 60 comprises a radially outer shroud 62 attached to the outer drum 50*b* axially downstream of it, and a radially inner shroud 63 integral with the second turbine shaft 24, particularly by means of a rear support shaft 25 extending between the inner shroud 63 and the second turbine shaft 24. The radially outer shroud 62 can be attached to the outer drum 50*b* by means of a bolted connection for example (not shown). Alternatively, the outer shroud 62 can be arranged in the axial extension of the outer drum 50*b*, forming a single and identical piece with the latter.

The inner 63 and outer 62 shrouds are concentric and axisymmetrical around the axis X. Radial arms, called downstream moving blades 61, extend radially between the inner shroud 63 and the outer shroud 62, and allow maintaining the latter integral with one another, the rotation of one causing the rotation of the other. Thus, when the blades 20 of the outer rotor are driven in rotation in the second direction of rotation, the rotation of the outer drum 50*b* causes the rotation to the outer shroud 62. This rotation movement is transmitted to the inner shroud 63 by means of the blades 61 of the downstream impeller 60, allowing the rotation of the second turbine shaft 24.

One method of attachment between the downstream moving blades 61, the outer shroud 62 and the outer drum 50*b* will be described with reference to FIGS. 2 to 5. Although the description makes reference to the outer shroud 62 hereafter, the invention is not limited to the latter, and is also applicable to the inner shroud 63.

Preferably, the outer shroud 62 comprises a plurality of sectors attached circumferentially to one another end to end so as to form an annular shroud. For the sake of simplification, FIGS. 2 to 5 each illustrate a single shroud sector 62, associated with a downstream moving blade 61. Each outer shroud sector 62 comprises a flexible transition part 620 attached to a platform 610 of one end of the downstream moving blade 61.

The platform 610 is attached to a radially outer end of the downstream moving blade 61, and forms a single and identical piece with it. The set of platforms 610, when they are assembled circumferentially, delimits the hot air flow stream.

A first embodiment of the present disclosure will be described with reference to FIGS. 2 and 3.

The platform 610 comprises an upstream end 612 and a downstream end 611. The upstream end 612 is a free end, and the downstream end 611 has the shape of a radial flange extending radially and being fastened to the flexible transition part 620.

The flexible transition part 620 comprises a first flange 621 extending radially at its upstream end. The first flange 621 is attached to the downstream end of the outer drum 50*b*, particularly to a radial flange of the latter, by means of a first bolted connection 71.

The flexible transition part 620 comprises a second flange 622 extending radially at its downstream end. The second flange 622 is attached to the downstream end of the platform 610, particularly to the downstream flange 611, by means of a second bolted connection 72. Preferably, the axis of the first and second bolted connection 71, 72 is substantially parallel to the axis of rotation X. The attachment between the downstream flange 611 of the platform 610 and the second flange 622 of the flexible transition part 620 can comprise two or more second bolted connections 72. FIG. 2 illustrates an example in which this attachment comprises two second bolted connections 72 (the first bolted connection 71 is not shown).

The flexible transition part 620 has the shape of a metal plate comprising for example a nickel-based alloy. This material being able to be used in other parts of the turbine, the invention therefor not requiring the use of a new material. The flexible transition part 620 preferably has a width equal to the width of the platform 610 to which it is attached. The principal plane along which the flexible transition part 620 extends is substantially parallel to the axis of rotation X. Thus the flexible transition part 620 has sufficient stiffness in the circumferential direction, allowing transmitting the torque originating in the outer drum 50*b*, to the downstream moving blades 61. Conversely, the flexible transition part 620 is more flexible in the radial direction, so that a force exerted by a downstream moving blade 61 causes a deformation of the flexible transition part 620.

The attachment between the flexible transition part 620 and the platform 610 is such that in non-constrained state, a space E, not necessarily constant, exists between these two parts, upstream of the attachment between them. What is meant by "non-constrained state" is a condition in which the flexible transition part 620 is not subjected to any deformation. This configuration is illustrated in FIGS. 2 and 3. Moreover, in this example, the flexible transition part 620 comprises a first portion 620*a* and a second portion 620*b*. The first portion 620*a* extends axially, from upstream to downstream, between the first flange 621 and the second portion 620*b*, and is inclined toward the center of the turbine, i.e. toward the axis of rotation X. The second portion 620*b* extends axially, from upstream to downstream, between the first portion 620*a* and the second flange 622, and is substantially parallel to the axis of rotation X. Moreover, the axis of the second bolted connection 72 is radially offset toward the center of the turbine, i.e. toward the axis of rotation X, relative to the axis of the first bolted connection 71. The space E is thus greater at the upstream end 612 of the platform 610.

In the event of radial dilation of the downstream moving blade 61, the platform 610 is displaced radially (upward in FIG. 3), its upstream end 612 being free. Conversely, the upstream end of the flexible transition part 620 is not free, but rigidly attached to the outer drum 50*b*. Thus, taking into account the attachment between the platform 610 and the flexible transition part 620, the displacement of the platform 610 causes an elastic deformation of the flexible transition part 620, facilitated by its structure and configuration. The displacement of the platform also causes a reduction of the space E. In the event of a decrease of temperature in the hot air flow stream, causing a retraction of the blade 61, the flexible transition part can then return to its initial shape. In other words, the flexible transition part 620 acts as a leaf spring allowing compensating and absorbing the deformations of the blade 61, without generating excessive stresses, due to the phenomenon of punching, in the shroud 62, and in particular in the platform 610.

A second embodiment of the present disclosure will be described with reference to FIG. 4.

According to this embodiment, the flexible transition part 620 has a shape identical to that of the first embodiment, and comprises in particular a first, inclined portion 620*a* and a second, straight portion 620*b*. Unlike the first embodiment, the platform 610 and the flexible transition part 620 are not two distinct parts, but form together a single and identical piece. Thus, the attachment between these two parts at their downstream end does not include the second bolted connection 72 of the first embodiment. On the other hand, the first bolted connection 71 is retained (not shown in FIG. 4). The shroud sector 62 is thus formed by being manufactured in a single piece with the blade 61, by casting or by additive manufacturing for example.

A third embodiment of the present disclosure will be described with reference to FIG. 5.

According to this embodiment, the method of attaching the flexible transition part 620 to the outer drum 50*b* and to the platform 610 is identical to that of the first embodiment, by means in particular of the first and of the second bolted connection 71, 72. On the other hand, the shape of the flexible transition part 620 differs from that of the first and of the second embodiment.

According to this third embodiment, the flexible transition part 620 comprises two radial folds 623. A radial fold 623 comprises a first wall 623*a* extending radially toward the outside from an upstream portion of the flexible transition part 620, a second wall 623*b* curved toward the inside of the turbine and extending from one end of the first wall 623*a*, and a third wall 623*c* extending radially toward the inside of the turbine from one end of the second wall 623*b*. The two folds 623 are linked together by an intermediate wall 624 curved toward the outside of the turbine. In this example, the flexible transition part 620 comprises two folds 623. However, this number is not limiting, the flexible transition part 620 being able to comprise a single radial fold 623, or a number greater than two radial folds 623. This accordion structure allows increasing the axial flexibility of the flexible transition part 620 compared to the structure of the first and second embodiments, while still retaining its radial flexibility.

Although the present invention has been described by referring to specific exemplary embodiments, it is clear that modifications and changes can be carried out on these examples without departing from the general scope of the invention as defined by the claims. In particular, individual features of the different embodiments illustrated/mentioned can be combined into additional embodiments. For example, the second and third embodiments can be combined, the flexible transition part 620 thus comprising at least one radial fold 623, and forming a single piece with the platform 610. Consequently, the description and the drawings should be considered in an illustrative, rather than a restrictive sense.

The invention claimed is:

1. A counter-rotating turbine for a turbine engine extending around an axis of rotation and comprising:
    an inner rotor configured to rotate around the axis of rotation, and comprising an inner drum to which a plurality of inner impellers is attached, each comprising inner moving blades and being rotatably supported by a first shaft,
    an outer rotor configured to rotate around the axis of rotation in a direction opposite to the direction of rotation of the inner rotor, and comprising an outer drum to which is attached a plurality of outer impellers, each comprising outer moving blades and being rotatably supported by a second shaft coaxial with the first shaft, the outer rotor comprising a downstream impeller which is downstream the other outer impellers according to the flow direction of the gases in the turbine along the axis of rotation, the downstream impeller having a plurality of downstream moving blades extending between an outer shroud and an inner shroud, an upstream end of the outer shroud being attached to the outer drum downstream of said outer drum, the inner shroud being attached to the second shaft,
    at least one of the inner shroud and of the outer shroud comprising at least one flexible transition part configured to allow elastic deformation of said shroud in the radial direction, wherein the outer shroud is attached to a platform of a radially outer end of a downstream moving blade, and wherein an upstream end of the platform is a free end not attached to the outer drum or to the outer shroud.

2. The turbine according to claim 1, wherein, the flexible transition part is attached between the downstream end of the outer drum and the platform so that a displacement of the platform in the radial direction causes an elastic deformation of the flexible transition part.

3. The turbine according to claim 2, wherein the flexible transition part has the shape of a plate as seen in a plan view parallel to the axis of rotation, and is attached at its upstream end to the outer drum, and at its downstream end to the platform, the flexible transition part being spaced radially from the platform between said upstream end and said downstream end.

4. The turbine according to claim 2, wherein a first attachment between the downstream end of the flexible transition part and the upstream end of the platform is radially offset toward the inside of the turbine relative to a second attachment between the upstream end of the flexible transition part and the outer drum.

5. The turbine according to claim 2, wherein the flexible transition part and the platform are two distinct parts, the downstream end of the platform being attached to the downstream end of the flexible transition part by means of a link.

6. The turbine according to claim 5, wherein the link comprises a bolted connection.

7. The turbine according to claim 2, wherein the flexible transition part and the platform form a single part.

8. The turbine according to claim 1, wherein the flexible transition part comprises, from its upstream end to its downstream end, at least one inclined portion inclined toward the center of the turbine, and at least one straight portion substantially parallel to the axis of rotation.

9. The turbine according to claim 1, wherein the flexible transition part comprises at least one radial fold, a radial fold being a portion of the flexible transition part comprising, from upstream to downstream, a first wall extending toward the outside of the turbine, a second wall curved toward the inside of the turbine and extending from one end of the first wall, and a third wall extending radially toward the inside of the turbine from one end of the second wall.

10. The turbine according to claim 1, wherein the outer shroud comprises a plurality of shroud sectors arranged circumferentially end to end, each shroud sector being attached to at least one downstream moving blade and comprising a platform and a flexible transition part.

11. A turbine engine comprising the counter-rotating turbine according to claim 1.

12. The turbine according to claim 2, wherein a downstream end of the platform has the shape of a radial flange extending radially and being fastened to the flexible transition part.

* * * * *